BEST AVAILABLE COPY
W. GALE.
BEST AVAILABLE COPY
Straw Cutter.
No. 2,393.
Reissued Nov. 13, 1866.
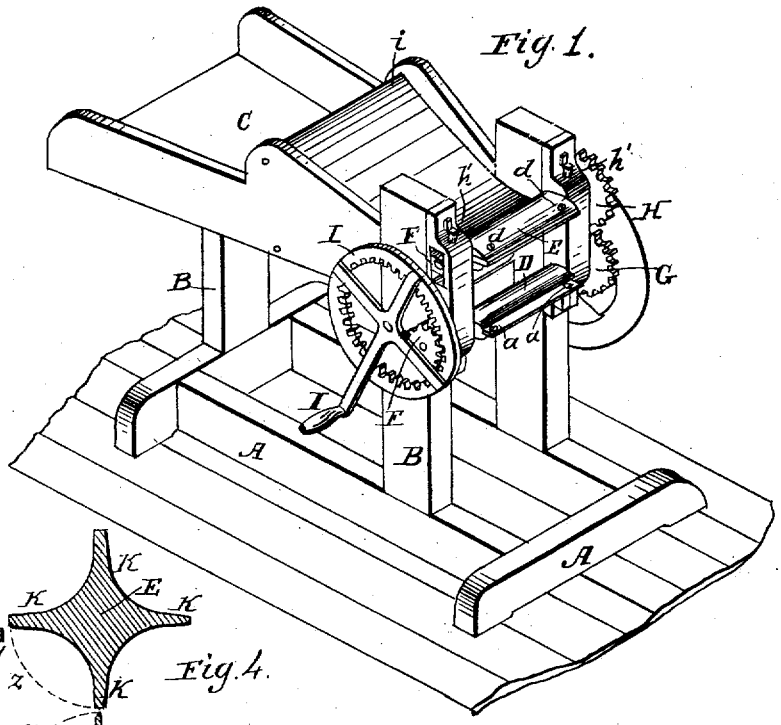
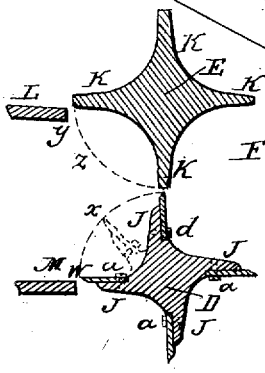
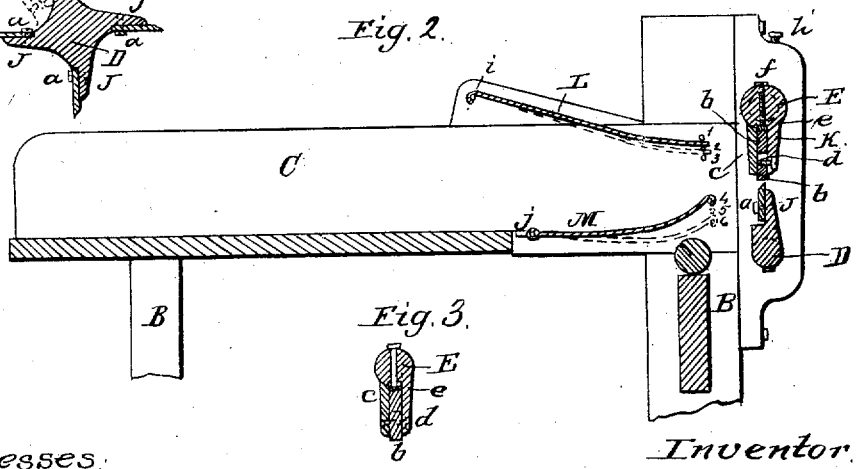
Witnesses.
Inventor.
Warren Gale
N. PETERS, Photo-Lithographer, Washington, D. C.

UNITED STATES PATENT OFFICE.

WARREN GALE, OF CHICOPEE FALLS, MASSACHUSETTS.

IMPROVEMENT IN STRAW-CUTTERS.

Specification forming part of Letters Patent No. 11,667, dated September 12, 1854; Reissue No. 938, dated April 3, 1860; Reissue No. 1,800, dated October 25, 1864; Reissue No. 2,393, dated November 13, 1866.

*To all whom it may concern:*

Be it known that I, WARREN GALE, now of Chicopee Falls, Hampden county, in the State of Massachusetts, but formerly of Troy, in the State of New York, have invented certain new and useful Improvements in Machines for Cutting Hay, Straw, and other Substances; and I do hereby declare that the following is a full and exact description thereof, reference being had to the accompanying drawings, and to the letters of reference thereon marked.

Figure 1 is a view, in perspective, representing a feed-cutter constructed according to my improvements. Fig. 2 is a vertical longitudinal section, showing the automatic and adjustable features of the mouth of the feed-box, the detachable strip, and the flanged pressure-cylinder, and the principal appendages of said parts. Fig. 3 is a detail view, representing a vertical section of the pressure-cylinder. Fig. 4 shows a machine having four flanges for the pressure-cylinder and four flanges and knives for the cutting-cylinder.

My improvements pertain only to those classes of cutting-machines which are provided with two revolving cylinders, the knives on one of them, which I term in this specification the "cutting-cylinder," cutting against the other, which I term the "pressure-cylinder;" and they consist, first, in providing the mouth of the feed-box with automatic mechanism, so constructed that it will adapt itself to, and keep against, the varying thicknesses of the body of feed in the mouth, when used in combination with a revolving cutting-cylinder, the knife or knives of which serve to draw in the feed; second, in forming the pressure-cylinder (at those parts against which the knife or knives are made to cut by the edge of the knife being brought into actual contact) in sections or strips separate from the body of the same, so that these sections or strips can be removed for repair or renewal without disturbing the main portion of the cylinder; third, in constructing the pressure-cylinder with one or more radial arms, flanges, or projections, so arranged that they shall at each revolution be brought into actual contact with the edge of the knife on the cutting-cylinder; fourth, in making the mouth of the feed-box so that it can be adjusted, and will help to make a long cut when expanded and a short cut when contracted, when used in combination with a revolving cutting-cylinder armed with one or more knives, cutting against a pressure-cylinder provided with one or more radial flanges, arms, or projections for the knife or knives to cut against.

To enable others to put my several improvements or any of them into use, I will explain one manner in which I have applied them with success.

In the drawings, A represents the base of the machine, and B the uprights for supporting the feed-box C. D is the cutting-cylinder, revolving in journals mounted transversely between the uprights B.

The mouth of the feed-box, as shown in Fig. 2, has two distinct features, either of which may be used without the other, or both of which may be used together. The first feature is making it automatic, so that it will adapt itself to, and keep against, the varying thicknesses of the body of material to be cut. The second feature is to make it adjustable, so as to admit or hold a thick or a thin body of material.

I have applied these features as follows: L is an upper mouth-piece, and M a lower mouth-piece, so arranged as to incline toward each other as they approach the knife. The upper one, L, is hinged or otherwise hung at *i*, and near its other end holes 1, 2, and 3 are pierced in the side of the box. By inserting a pin in any one of these holes above the mouth-piece its front end will be prevented from rising so as to expand the mouth beyond a certain point, and will consequently hold a thick or thin amount of material, as may be desired. The same results can be accomplished, if desired, by means of the lower mouth-piece, M, also hinged or otherwise hung at *j*, and its front end, resting on the pin in holes 4, 5, or 6, is prevented from opening beyond a certain point. Any other convenient means may be used for moving or holding the front ends of either or both of these mouth-pieces. The lower mouth-piece, M, at *j*, may be hung in a slot, so that the front end can be made to maintain its relation near the knife; for, when I use a knife-cylinder, say, five inches in diameter, the distance between the cutting-cylinder and the mouth-piece is greater than when a smaller diameter of cylinder is used, and it is best to keep the lower mouth-piece as near to the knife as is conveniently practicable, so as to prevent any very long pieces of the straw, &c., from falling between the knife and mouth uncut.

The space between the lower mouth-piece and the knife serves a good purpose—to let out a portion of dust or dirt from the feed, and prevents any that may have fallen on the mouth-piece from being swept into the cutting part of the machine, to injure the edge of the knife or fall into the cut feed.

These mouth-pieces are made of metal, and are curved in in-form; but this construction is not necessary. A simple straight piece of any material may be used. Nor is it essential that both should be made adjustable. The object can be well accomplished by adjusting one only.

It will be seen that while the mouth is so constructed that it can be prevented from opening beyond the particular point to which it may be adjusted, yet it is at all times left free to adapt itself to the varying thickness of the feed in the mouth, and keep against it, whether the mouth is full or only partially full of feed, so that the mouth-piece shall constantly operate automatically to hold the feed for the next cut. I have illustrated in my drawings this automatic feature with the upper mouth-piece, L, as this is the cheapest and simplest way of making it, its own weight being sufficient to hold the feed. I do not desire to confine myself to this precise mode of constructing the automatic mouth. Any other device may be used so long as the mode of operation is not substantially departed from. The red lines show the adjustment of mouth-pieces L and M by pins.

When this class of machines—that is, a machine having a revolving cutting-cylinder cutting against an opposite pressure-cylinder—is made with a series of knives placed so near together or so arranged that the following knife will grasp the feed before the preceding knife releases its hold of it, the length of the cut is governed by the distance between two adjoining knives, and the feed is sufficiently held by the knives themselves. The application to such a machine of the automatic or adjustable features of the mouth of the feed-box would result in no advantage, whether these knives are made to cut against an ordinary pressure cylinder or roller or against a flanged pressure-cylinder.

This class of machines have also, in some cases, been constructed with knives so far apart that one knife will release its hold of the feed before the following knife will grasp it enough to hold it; but it has not, to my knowledge, been used in combination with a feed-box having the mouth made automatic; and it is to this class of machines, when constructed with one knife, (or, if more than one is used, arranged as above described,) that the adjustable feature of the mouth of the feed-box becomes useful, and the automatic feature especially useful, when it is desired to cut the feed uniformly fine.

The object of the automatic feature of the mouth is this. It frequently happens in operating the machine, that the mouth will not be full of feed, and that the volume of feed, without great care, will vary in thickness. Now, if the mouth of the feed-box is not automatic, when the volume of feed becomes thin, as it often does, even to a few straws, its pressure against the sides, top, and bottom of the mouth would not be sufficient to hold it, and hence it is desirable that the mouth shall be made automatic, so as to follow up and adapt itself to the varying thickness of the feed.

The amount of pressure that it is necessary for the automatic mouth to exercise will be readily understood. It is not desirable, however, especially when the machine is worked by hand-power, that the pressure should be unnecessarily great, because it would make the feed so much the harder to be drawn in, and it will require less force to hold the feed when the spiral or oblique knife is used than when the straight one is used, and less force on a small machine than on a large one. The result of this automatic feature is that I can construct a machine with even one knife that will work well and cut as short as those heretofore constructed with six or eight knives and without the automatic mouth, and will cut faster than those made with eight or ten knives, because the body of feed admitted to my machine is much greater, and the knives are so far apart that they can be made thicker, and the cylinder can be made stronger.

By means of the adjustable feature of the mouth a thick or thin body of feed is admitted to the knives. Now, if the mouth is expanded, the feed is caught between the edge of the knife and the pressure-cylinder or its flange at a greater distance from the center of the cutting-cylinder, and a longer cut is made. When the mouth is contracted the feed is caught at a point nearer to the center of the cutting-cylinder and a shorter cut is made. The length of the cut varies according to the thickness of the volume of feed.

The automatic feature of the mouth of the feed-box, when combined with the revolving cutting-cylinder arranged with one or more knives, as described, is complete of itself, and may or may not be used in connection with my other improvements.

I construct the detachable strip or section, when applied to a flanged pressure-cylinder, as follows: I make it of leather, rawhide, or other suitable material to protect the edge of the knife as it is brought into actual contact with it. It is placed between flange K and plate *c*, binding the whole together by a screw, *d*. I use a second plate, *e*, on which the strip rests, and against which the screw *f*, which passes through the axis of the cylinder E, may bear. By this means the detachable strip may be moved out to meet the knife. But when more than one flange is used, on which the strip is applied, I cannot use this mode of adjusting, and I omit plate *e* and screw *f*, and move the whole cylinder, as hereinafter described.

My invention consists in the detachable strip itself when applied to a pressure-cylinder of a feed-cutter, and is not for any particular mode of holding it in place. It is necessary, however, that it should be of suitable material to protect the edge of the knife, and that it should be easily detachable from the pressure-cylinder.

By making those parts of the pressure-cylinder against which the edge of the knife strikes in detached strips or sections I obviate the necessity of removing the whole cylinder when such portions become cut out, or for any reason need renewal, thus enabling me to reduce the cost of such renewals very materially, besides lessening the first cost of the cylinder.

It will be seen that this part of my invention is complete in itself, and may or may not be used in connection with my other improvements.

I connect the cutting-cylinder D to the pressure-cylinder E by gears G and H. This mode of connection renders them capable of being so operated that at each revolution the knife or each of the knives on the cutting-cylinder shall come into contact with any point of the pressure-cylinder which they are adjusted to strike, and shall continue to cut at this point until a new adjustment is made. The advantage of this gearing is that each knife strikes on a place of its own on the pressure-cylinder, to which it soon becomes adapted and works well, although the edges of the several knives may not all be in a line. These gears may be put in motion by the crank I acting through the master cog-wheel I′ and the pinion F, or by any other mover acting in any convenient manner. I find by experience that the best way is to communicate the power directly by means of a crank, or otherwise, to the cylinder D. The knives may be secured to the cylinder in any other usual modes. I prefer, however, to fasten them by screws *a* to flange J, cast or otherwise formed on the cylinder D. Slots may be placed in the knife, so that it can be adjusted by means of a screw passing through the cylinder. When more than one knife is used I have to dispense with the adjusting-screw, and adjust the whole cylinder by means hereinafter described.

This class of machines, as heretofore constructed, has been made with the pressure-cylinder of full cylindrical form, as, for example, Hovey's patent. Others have been made with a series of strips, like James Sanford's patent of October 12, 1843, the knives on the cutting-cylinder cutting in between the strips on the other cylinder, but not in contact, the body or volume of feed that can pass into Sanford's cutter being still less than the volume that can pass into Hovey's machine.

Figs. 2 and 3 represent my improved pressure-cylinder; and it will be seen that, instead of being of full cylindrical shape, it is made with a radial flange, arm, or projection, K, upon its exterior. The main advantage of this construction is that it will allow a greater depth of feed to pass into the machine and be cut than can be in using a cylinder of full cylindrical shape.

When we consider that these machines are used for cutting loose hay or straw, which must be compressed into one-fourth of its original bulk before it is sufficiently dense to be cut even by a sharp knife, and to a still less bulk when the knife has lost its keenness, it will be apparent that the advantage of this mode of construction is very great. Among other advantages, it takes firmer hold of the feed than a full cylinder or roller, and is cheaper made. This flange or projection may be made of any suitable material, but should be sufficiently strong to resist the action of the knife, and to avoid being broken in cutting coarse material, like cane or corn-stalks. It may be armed with the detachable strip of soft material on its face. It is necessary, however, to its successful operation that the knife on one cylinder and the flange on the other should come into actual contact at each revolution, because if not so constructed there would be a quantity of feed corresponding with the space between the knife and flange uncut. It is a characteristic of this arrangement that a machine can be made to work successfully and rapidly, cutting off all the feed with a single knife and a single flange.

I am aware that machines have been before constructed which would successfully operate, having a single knife cutting against a stationary knife or bar; but this class of machines is not self-feeding, unless made so by a separate feeding apparatus; and I consider this class as different from that which feeds itself by working against an opposite pressure-cylinder.

An automatic mouth, even when precisely like the mouth described, when used in combination with the revolving cutting-cylinder cutting against the stationary bar, would not have the effect of reducing the number of knives.

The advantage of the arrangement of the flanged pressure-cylinder is more particularly shown in Fig. 4, showing the machine constructed with four knives and four flanges upon a cylinder intended to be about three and a half inches in diameter—the usual size of constructing the cylinders. If the cylinder had been of full cylindrical form, like a roller, the amount of feed that it would take hold of and draw in is shown by the distance between the edge of the knife at *x* and the dotted line at *z* on the pressure-cylinder, as this would be as large a volume as the knife and flange could grasp, or just sufficient to draw it forward; whereas if made with the flanges the amount of feed it would freely grasp and draw in is shown by the distance between the edge at *w* and the flange at *y*.

The journals F′ rest in oblong slots *h*, so that by means of set-screws *h′* the journals and their pressure-cylinder may be adjusted to the knife or knives, and this is the method I use when more than one knife is used. The knives may be placed on the cylinder parallel with its center, or the oblique or spiral knife may be used, or any of the usual forms of arranging the knife on the cylinder. Any of these well-known forms or positions of the knife cutting against a flanged pressure-cylinder may be used with greater advantage than when cutting against a full cylinder.

I believe that the best method is to use the spiral knife, ground with its bevel on the back side, and so arranged that it shall strike the flange on its face, (in preference to cutting against either of its edges,) and that the face of the flange be provided with some suitable soft material to protect the edge of the knife.

If, however, it is preferred to construct the flange without the protecting material, more care should be used in arranging the edge of the knife so that it will not strike unnecessarily hard against the face or edge of the flange, because there is more danger of breaking the knife or injuring the flange than when it is protected by soft material.

I am aware that the mouths of straw-cutters have been made adjustable, so as to approach or recede from the knife, and also so as to contract and expand, in order to compress the straw more or less. I do not, therefore, claim these features as heretofore used. I limit my claims to these features, or to any of them, or to any of the modes described for working or adjusting the feed-box, to their use and combination with a revolving cutting-cylinder, armed with one knife, or with several knives, placed so far apart or so arranged that one knife shall release its hold of the feed before the following knife shall grasp it sufficiently to hold it.

By the term "several knives" I mean any number from one to four, as it is never desirable to use more than four when the machine is used for a feed-cutter; and when cylinders are used from two and a half to three and a half inches in diameter (the most usual sizes) three knives are most desirable, as when more are used much of the benefit of the fly-wheel is lost.

Having fully described my invention, what I claim as new, and desire to secure by Letters Patent, is as follows:

1. The automatic mouth of a feed-box constructed by any means substantially the same as described, when used in combination with a revolving cutting-cylinder armed with one knife, or with several knives, so arranged that one knife shall release its hold upon the material being cut before the following knife shall grasp it sufficiently to hold it, substantially as and for the purposes set forth.

2. The adjustable bottom mouth-piece M, or its equivalent, constructed and operating substantially as and for the purposes set forth.

3. Combining a revolving cutting-cylinder armed with one knife, or with several knives, so arranged that one knife shall release its hold upon the material being cut before the following knife shall grasp it sufficiently to hold it, with a hinged bottom mouth-piece of a feed-box, substantially as and for the purposes described.

4. An automatically-operating mouth to a feed-box, in combination with a revolving knife-cylinder armed with one knife, or with several knives, so arranged that one knife shall release its hold upon the material being cut before the following knife shall grasp it sufficiently to hold it, when this cylinder is geared to a revolving pressure-cylinder, substantially as and for the purposes set forth.

5. Making those parts of the pressure-cylinder against which the knife or knives are made to cut by having their edges brought into actual contact therewith in sections or strips separate from the body of the cylinder, substantially as and for the purposes set forth.

6. A revolving cutting-cylinder having one or more knives, in combination with a pressure-cylinder having one or more radial flanges, arms, or projections, so arranged that the knife or knives shall, as they revolve, meet the flange, arm, or projection, or either of them, in actual contact, so that the material to be cut is caught between the two, drawn forward, and cut off by the pressure between the knife on one cylinder and the flange on the other, substantially as and for the purposes set forth.

7. The flanged pressure-cylinder, arranged and operated substantially as described, when the face of the flange is covered with suitable soft material to protect the edge of the knife when used in combination with a revolving cutting-cylinder, substantially as and for the purposes set forth.

8. An automatically-operating mouth of a feed-box or an adjustable mouth of a feed-box, substantially as described, in combination with a revolving cutting-cylinder armed with one knife, or with several knives, so arranged that one knife shall release its hold upon the material being cut before the following knife shall grasp it sufficiently to hold it, and with a revolving pressure-cylinder armed with one or more radial arms, flanges, or projections, substantially as and for the purposes set forth.

9. A pressure-cylinder provided with one or more radial flanges, arms, or projections, and a revolving cutting-cylinder armed with one knife, or with several knives, so arranged that one knife shall release its hold upon the material being cut before the following knife shall grasp it sufficiently to hold it, when these cylinders are used in combination with a hinged bottom mouth-piece of a feed-box, substantially as and for the purposes set forth.

In testimony that I claim the above improvements in machines for cutting hay, &c., I have hereto signed my name.

WARREN GALE.

Witnesses:
E. V. B. HOLCOMB,
J. G. HUMPHREYS.